(12) United States Patent
Bose et al.

(10) Patent No.: US 9,710,044 B2
(45) Date of Patent: *Jul. 18, 2017

(54) POWER SHIFTING IN MULTICORE PLATFORMS BY VARYING SMT LEVELS

(71) Applicant: International Business Machines Corporation, Armonk, NY (US)

(72) Inventors: Pradip Bose, Yorktown Heights, NY (US); Alper Buyuktosunoglu, White Plains, NY (US); Hubertus Franke, Cortlandt Manor, NY (US); Priyanka Tembey, Atlanta, GA (US); Dilma M. Da Silva, College Station, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/603,722

(22) Filed: Jan. 23, 2015

(65) Prior Publication Data
US 2015/0134987 A1    May 14, 2015

Related U.S. Application Data

(63) Continuation of application No. 13/476,179, filed on May 21, 2012, now Pat. No. 9,003,218.

(51) Int. Cl.
*G06F 1/32* (2006.01)
*G06F 9/50* (2006.01)
(Continued)

(52) U.S. Cl.
CPC ............ *G06F 1/3206* (2013.01); *G06F 1/26* (2013.01); *G06F 1/329* (2013.01); *G06F 9/4893* (2013.01);
(Continued)

(58) Field of Classification Search
None
See application file for complete search history.

(56) References Cited

U.S. PATENT DOCUMENTS 7,197,652 B2    3/2007  Keller, Jr. et al.
7,219,241 B2    5/2007  Cooper et al.
(Continued)

OTHER PUBLICATIONS

Charles Lefurgy et al., "Power Capping: A Prelude to Power-Shifting", (IBM Austin) 2007.
(Continued)

*Primary Examiner* — Kim Huynh
*Assistant Examiner* — Danny Chan
(74) *Attorney, Agent, or Firm* — Patent Portfolio Builders PLLC

(57) ABSTRACT

Power consumption in a microprocessor platform is managed by setting a peak power level for power consumed by a multi-core microprocessor platform executing multi-threaded applications. The multi-core microprocessor platform contains a plurality of physical cores, and each physical core is configurable into a plurality of logical cores. A simultaneous multithreading level in at least one physical core is adjusted by changing the number of logical cores on that physical core in response to a power consumption level of the multi-core microprocessor platform exceeding the peak power level. Performance and power data based on simultaneous multi-threading levels are used in selecting the physical core to be adjusted.

20 Claims, 6 Drawing Sheets

(51) Int. Cl.
*G06F 9/48* (2006.01)
*G06F 1/26* (2006.01)

(52) U.S. Cl.
CPC .............. *G06F 9/50* (2013.01); *G06F 1/3203* (2013.01); *Y02B 60/144* (2013.01)

(56) References Cited

U.S. PATENT DOCUMENTS

| | | | |
|---|---|---|---|
| 7,447,923 | B2 | 11/2008 | Bose et al. |
| 7,496,915 | B2 | 2/2009 | Armstrong et al. |
| 7,512,826 | B2 | 3/2009 | Armstrong et al. |
| 7,653,909 | B2 | 1/2010 | Brenner |
| 7,676,660 | B2 | 3/2010 | Kissell |
| 7,797,512 | B1* | 9/2010 | Cheng ..................... G06F 9/455 712/10 |
| 7,886,172 | B2 | 2/2011 | Bose et al. |
| 7,890,734 | B2 | 2/2011 | Golla |
| 7,930,574 | B2 | 4/2011 | Cai et al. |
| 7,930,578 | B2 | 4/2011 | Bose et al. |
| 7,992,151 | B2 | 8/2011 | Warrier et al. |
| 8,055,822 | B2 | 11/2011 | Bernstein et al. |
| 8,108,863 | B2 | 1/2012 | Rakvic et al. |
| 8,209,559 | B2 | 6/2012 | Memon et al. |
| 8,281,308 | B1 | 10/2012 | Cheng et al. |
| 8,296,773 | B2 | 10/2012 | Bose et al. |
| 8,365,175 | B2 | 1/2013 | Angaluri |
| RE44,494 | E | 9/2013 | Sager et al. |
| 8,543,843 | B1 | 9/2013 | Cheng et al. |
| 8,639,955 | B2 | 1/2014 | Bose et al. |
| 2001/0052800 | A1* | 12/2001 | Mizuno ..................... G06F 1/32 327/1 |
| 2005/0166075 | A1 | 7/2005 | Hack |
| 2006/0095807 | A1 | 5/2006 | Grochowski et al. |
| 2007/0074011 | A1* | 3/2007 | Borkar ................... G06F 1/3203 712/227 |
| 2008/0307240 | A1* | 12/2008 | Dahan ........................ G06F 1/06 713/320 |
| 2009/0063885 | A1* | 3/2009 | Arimilli ................ G06F 9/5038 713/375 |
| 2009/0150896 | A1 | 6/2009 | Tsushima et al. |
| 2010/0122064 | A1 | 5/2010 | Vorbach |
| 2011/0022857 | A1* | 1/2011 | Nussbaum ............ G06F 1/3203 713/300 |
| 2011/0219246 | A1 | 9/2011 | Arai |
| 2012/0233477 | A1 | 9/2012 | Wu et al. |
| 2013/0205126 | A1* | 8/2013 | Kruglick ................ G06F 1/324 713/1 |
| 2013/0311811 | A1 | 11/2013 | Bose et al. |

OTHER PUBLICATIONS

Felter et al., "A Performance-Conserving Approach for Reducing PeakPower Consumption in Server Systems", ICS 2005 (IBM Austin).

Heng Zeng et al., "ECOSystem: Managing Energy as a First ClassOperating System Resource", ASPLOS X 10/02 San Jose, CA, USA (2002).

Ming Chen, Xiaorui Wang and Xue Li, "Coordinating processor and Main memory for Efficient Server Power Control", ICS'11, May 31-Jun. 4, 2011, Tuscon, Arizona, USA.

Mishra, Asit et al., "CPM in CMPs: Coordinated Power Management in CMPs", SC10 Nov. 2010, New Orleans, Louisiana.

Wang, X., Ma, K. et al., "Adpative Power Control with Online Model Estimation for Chip Multiprocessors", IPDPS 2011.

* cited by examiner

POWER SHIFTING IN MULTICORE PLATFORMS BY VARYING SMT LEVELS

CROSS-REFERENCE TO RELATED APPLICATIONS

The present application is a continuation of co-pending U.S. patent application Ser. No. 13/476,179 filed May 21, 2012. The entire disclosure of that application is incorporated herein by reference.

FIELD OF THE INVENTION

The present invention relates to microprocessor power and workload management.

BACKGROUND OF THE INVENTION

The desire for increased production or workload in a microprocessor platform needs to be balanced with the management of power consumption by that platform. This includes controlling the peak power demands of that microprocessor platform. Existing solutions to workload and power management exploiting mutually exclusive activation of resources or token-based control and power shifting across processor and memory resources, depending on whether the workload phase is central processing unit (CPU) bound or memory-bound. Both of these methods, however, have limitations on their implementations and ability to provide the desired level of workload and power management.

Information about mutually exclusive regions of the logic requires significant analysis, which is hard to automate in tool form. The information has to be generally gleaned manually from designer knowledge. In some implementations, the opportunities for absolute mutual exclusion are quite small, unless the designer is aware from the beginning about the plan to use this style of peak power control. Similarly, the token-based control of peak power requires careful analysis to make sure that the algorithm for token allocation and de-allocation does not hurt system performance in a significant manner. There is no straightforward, simple rule of thumb that would allow one to assess the performance cost of enforcing peak power using these two methods. This makes it hard to commit such power control algorithms to hardware, since some workloads may experience unpredictably large performance hits.

Power shifting across CPU and memory resources capitalizes on the observation that workloads often go through alternate durations of CPU-bound and memory-bound behavior. However, if each processor core supports n-way multithreading, e.g., simultaneous multithreading (SMT), where "n" may be as large as 8, the probability of all 8 threads in a core moving from CPU-bound mode to memory-bound mode and vice versa in synchrony is rather small in the general case. Hence, the opportunity of power savings may become rather small if this is the only actuator that is used to shift power across distinct resource regions while maintaining a power cap. Also, in both of the prior systems for power management, the primary hardware mechanisms used to disable or throttle a resource when shifting power elsewhere are actuators like clock-gating, power-gating, dynamic voltage and frequency scaling (DVFS) or fetch throttling. Opportunities for getting such actuators engaged for power reduction are very limited in n-way multithreaded cores where "n" is large (e.g. 4 or 8).

Other related methods for peak power management fail to work very well in the presence of heavily multithreaded processor cores. As such, there is a need for peak power control systems and methods that work well for modern multi-core microprocessors in which significant levels of multithreading are supported for every core in order to maximize the microprocessor's workload throughput performance for a given area and power budget.

SUMMARY OF THE INVENTION

Systems and methods in accordance with exemplary embodiment of the present invention utilize power-shifting policies and mechanisms that vary SMT levels for each core in multi-core microprocessor platforms. These multi-core microprocessor platforms are used to execute one or more multi-threaded applications, and adjustment of the per-core SMT levels adjusts the parallelism for the execution of the application threads. Varying SMT levels is an effective mechanism for maintaining peak platform power under a pre-determined power cap. In addition, available power under the cap is shifted between cores for performance benefits. Exemplary systems and methods in accordance with the present invention consider both the performance and power implications of SMT microprocessor platforms. SMT applications have varying CPU and memory power curves due to their varying performance curves when SMT levels are changed. Given that multiple SMT workloads may be consolidated on a multi-core platform, running SMT workloads with different power curves is an effective tool to perform workload characterization-driven power shifting between cores on a SMT multi-core microprocessor platform. Power-related knowledge of SMT workloads is used to perform power-shifting within a given power cap for a SMT multi-core microprocessor platform.

Systems and methods in accordance with the present invention allow power-shifting based peak power control to be applied to a system composed of SMT-equipped cores where prior techniques were ineffective. The actuator for power control and power shifting is a simple dynamic change of SMT mode or degree, which can be implemented non-intrusively in a current generation microprocessor without added investment in design-intrusive actuators like DVFS and power-gating among others.

In accordance with one exemplary embodiment, the present invention is directed to a system for managing power consumption in a microprocessor platform. This system includes a simultaneous multi-threaded platform containing a plurality of physical cores. Each physical core is configurable into a plurality of logical cores, and each logical core executes a thread of a multi-threaded application running on the simultaneous multi-threaded platform. A system power monitor is provided in communication with the simultaneous multi-threaded platform and is configured to monitoring a current power consumption level of the simultaneous multi-threaded platform continuously and to compare the current power consumption level to a pre-defined peak power level. A system power controller is included in communication with the system power monitor and the simultaneous multi-threaded platform to adjust simultaneous multithreading levels in the physical cores by changing a number of logical cores on each physical core available to execute the multi-threaded application threads in response to a notification by the system power monitor that the current power consumption level exceeds the peak power level.

In one embodiment, the system includes a central processing unit power sensor in communication with the simultaneous multi-threaded platform and the system power monitor to monitor central processing unit power consumption and a memory power sensor in communication with the simultaneous multi-threaded platform and the system power monitor to monitor memory system power consumption. The current power consumption level includes at least one of the central processing unit power consumption and the memory system power consumption. In one embodiment, the central processing unit power consumption is power consumed by the physical cores in processing multi-threaded application threads, and the memory system power consumption is power consumed by the multi-threaded application threads in accessing system memory. The system can also include an actuator in communication with the system power controller and the simultaneous multi-threaded platform to adjust the number of logical cores on the physical cores in response to instructions from the system power controller.

In one embodiment, the system power controller is configured to select physical cores in which to change a number of logical cores in a random sequence. Alternatively, the system includes a throughput performance monitor in communication with the simultaneous multi-threaded platform and the system power controller to monitor a number of instructions per second being executed currently on each physical core within the simultaneous multi-threaded platform. The system power controller is configured to select physical cores in which to change a number of logical cores in series based upon a number of currently executing instructions per second on each physical core from a lowest number of instructions per second to a highest number of instructions per second.

In one embodiment, the system includes a power daemon in communication with the system power controller to determine physical cores on which to change the number of logical cores. The power daemon is in communication with a database containing an identification of a plurality of bins. Each bin is a subset of the plurality of physical cores, and each physical core in a given bin has a common power consumption curve of multi-threaded application execution time versus power consumption and a common performance curve of level of multi-threading versus amount of speedup in multi-threaded application execution for a given adjustment of multi-threading level. The power daemon determined physical cores are bins within the plurality of bins.

In one embodiment, the present invention is directed to a method for managing power consumption in a microprocessor platform in which a peak power level for power consumed by a multi-core microprocessor platform executing multi-threaded applications is set. The multi-core microprocessor platform includes a plurality of physical cores. Each physical core is configurable into a plurality of logical cores; and a simultaneous multithreading level is adjusted in at least one physical core by changing a number of logical cores on that physical core in response to a power consumption level of the multi-core microprocessor platform exceeding the peak power level. In one embodiment, the multi-threading level is adjusted in a plurality of physical cores by changing the number of logical cores on each physical core. In one embodiment, changing the number of logical cores includes decreasing the number of logical cores on at least one physical core and increasing the number of logical cores on at least one physical core.

In one embodiment, the number of logical cores is decreased for a plurality of physical cores in series until a current power consumption level is less than or equal to the peak power level. In addition, the current power level consumption is monitored continuously, and the serial decreasing of the number of logical cores through the plurality of physical cores is repeated each time the current power consumption level exceeds the peak power level. In one embodiment, adjusting the simultaneous multithreading level further includes decreasing the number of logical cores for a given physical core having a lowest number of currently executing instructions per second among the plurality of physical cores. In another embodiment, adjusting the simultaneous multithreading level includes decreasing the number of logical cores for a plurality of physical cores in series based upon a number of currently executing instructions per second on each physical core from a lowest number of instructions per second to a highest number of instructions per second until a current power consumption level is less than or equal to the peak power level.

In one embodiment, the method includes monitoring the number of currently executing instructions per second continuously for each one of the plurality of physical cores. In addition, adjusting the simultaneous multithreading level further includes adjusting the simultaneous multithreading level in a plurality of physical cores to achieve a desired power savings and to maximize performance of the multi-core microprocessor platform in executing multi-threaded applications. In one embodiment, a power consumption curve of multi-threaded application execution time versus power consumption and a performance curve of level of multi-threading versus amount of speedup in multi-threaded application execution for each physical core are used to select one or more physical cores. The simultaneous multi-threading level in the selected physical cores are adjusted to achieve a desired power savings and to maximize performance of the multi-core microprocessor platform in executing multi-threaded applications. In one embodiment, the multi-threading level is shifted among the selected physical cores by decreasing the number of logical cores on at least one selected physical core and increasing the number of logical cores on at least one selected physical core.

In one embodiment, the plurality of physical cores is arranged into a plurality of bins. Each bin is a subset of the plurality of physical cores, and each physical core in a given bin has a common power consumption curve of multi-threaded application execution time versus power consumption and a common performance curve of level of multi-threading versus amount of speedup in multi-threaded application execution for a given adjustment of multi-threading level. At least one bin is selected from the plurality of bins, and simultaneous multi-threading levels are adjusted for all physical cores in each selected bin. In one embodiment, physical cores are selected that realize power savings without a decrease in performance for a given decrease in multi-threading level of those physical cores. In another embodiment, physical cores are selected having a largest ratio of power savings to performance decrease for a given decrease in multi-threading level of those physical cores. In one embodiment, physical cores running applications are identified having memory intensive phases during which a given decrease in multi-threading level is possible without a decrease in performance and central processing unit intensive phases in which the given decrease in multi-threading level yields a decrease in performance. These physical cores are selected during the memory intensive phases.

DETAILED DESCRIPTION

Systems and methods in accordance with the present invention provide for the manipulation of simultaneous multi-threading levels (SMT) within a given computing platform in order to keep power consumption by the computing platform under a prescribed peak power level while maximizing computing throughput by the computing platform in terms of the time required to execute a multi-threaded computer application on the computing platform. The manipulation of the SMT levels includes decreasing SMT levels on given cores within the computing platform and shifting SMT levels between physical cores. This manipulation can be based on naïve policies of core selection and reduction, simple polices based on a current throughput of each core and more complicated polices based on an understanding of the affect of SMT level manipulation on the performance and power consumption of each core.

Figure 1:
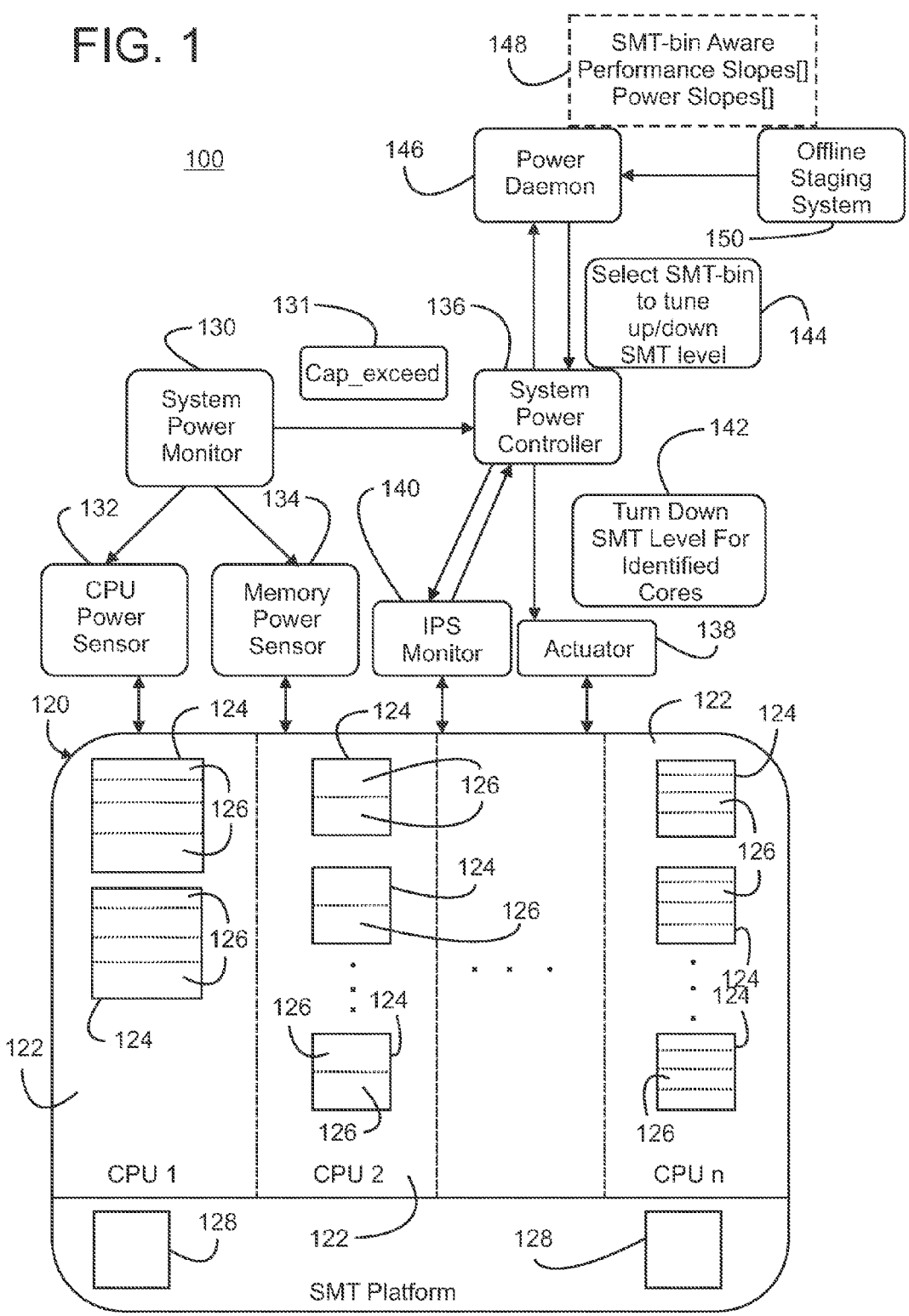
FIG. 1 is a schematic representation of an embodiment of a system for managing power consumption in a microprocessor platform in accordance with the present invention.

Referring initially to FIG. 1, an exemplary embodiment of system 100 for managing power consumption in a microprocessor platform in accordance with the present invention is illustrated. As illustrated, the system provides for manipulating SMT levels based on three different criteria, random selection of physical cores, selection based on the number of instructions per second currently being executed and selection based on performance and power characteristics. Other embodiments of system in accordance with the present invention, however, may only provide for one of these criteria or a combination of any two of these criteria. As illustrated, the system includes a simultaneous multi-threaded platform 120. The SMT platform can include one or more central processing units (CPUs) 122 each containing a plurality of physical cores 124. These physical cores are logically dividable or configurable into a plurality of logical cores 126. This arrangement of physical cores and logical cores determines the SMT level or degree of parallelism of the SMT platform. Each logical core executes a thread of a multi-threaded application running on the simultaneous multi-threaded platform. Therefore, increasing the number of logical cores increases the number of application thread that can be executed simultaneously, i.e., in parallel. However, this also increases the power consumption of the SMT platform. The SMT platform also includes one or more databases or memory modules 128. These memory modules may also be located external to the SMT platform.

The system also includes a system power monitor 130 in communication with the simultaneous multi-threaded platform 120. The system power monitor can be configured as software, hardware or a combination of software and hardware executing on one or more computing systems and is configured to monitor the current power consumption level of the simultaneous multi-threaded platform. Preferably, the current power consumption level is monitored continuously. The system power monitor then compares the current power consumption level to a pre-defined peak power level. Upon detection of a current power consumption level exceeding the peak power level, the system power monitor generates and publishes a message 131 indicating that the peak power level, i.e., the cap, has been exceeded.

In order to provide for the monitoring of power consumption levels, the system 100 includes a central processing unit power sensor 132 in communication with the simultaneous multi-threaded platform and the system power monitor to monitor central processing unit power consumption within the SMT platform. This is the power consumed by the CPUs in processing the threads of multi-threaded applications executing on the SMT platform. In addition, a memory power sensor 134 is provided in communication with the simultaneous multi-threaded platform and the system power monitor to monitor memory system power consumption, both internal too and external to the SMT platform. The memory system power consumption is power consumed by the multi-threaded application threads in accessing system memory. The current power consumption level can be the central processing unit power consumption or a combination of the central processing unit power consumption and the memory system power consumption.

The system includes a system power controller 136 in communication with the system power monitor 130 and the simultaneous multi-threaded platform 120. The system power controller can be configured as software, hardware or a combination of software and hardware executing on one or more computing systems and adjusts simultaneous multi-threading levels in the physical cores by changing a number of logical cores on each physical core within the SMT platform. This changes the number of logical cores available to execute the multi-threaded application threads and is performed in response to a notification, i.e., the message 131 from the system power monitor that the current power consumption level exceeds the peak power level. In order to make the desired changes to the SMT levels within the SMT core, the system includes at least one actuator 138 in communication with the system power controller and the simultaneous multi-threaded platform. The actuator can be configured as software, hardware or a combination of software and hardware executing on one or more computing systems and adjusts the number of logical cores on the physical cores in response to instructions 142 from the system power controller. These instructions include an identification of the CPUs or cores on which to modify the SMT level and the desired modifications to these SMT levels. These modifications include, but are not limited to, the number of SMT levels to change and whether the SMT level is to be increased or decreased by the specified number of SMT levels. Therefore, the system of the present invention supports both decreasing SMT levels for various physical cores and shifting SMT levels among the cores, i.e., by decreasing SMT levels for one or more cores while concurrently increasing SMT levels for one or more cores.

Selection by the system power controller of the physical cores to have their SMT levels modified can be based on varying criteria. In one embodiment, the system power controller does not use any additional data or inputs and selects the physical cores in which to change a number of logical cores in a random sequence. In another embodiment, the system power controller uses data about the current activity in each physical node to select the physical nodes to be modified and the desired modifications. Therefore, the system includes a throughput performance monitor 140 in communication with the simultaneous multi-threaded platform and the system power controller to monitor a number of instructions per second being executed currently on each physical core within the simultaneous multi-threaded platform. Therefore, selection of the physical cores is based on a historical record of the throughput performance of each physical core, and the physical cores in which to change a number of logical cores is selected in series based upon a number of currently executing instructions per second on each physical core from a lowest number of instructions per second to a highest number of instructions per second. Therefore, physical cores with lower performance levels, i.e., a lower number of instructions per second, are selected and modified first.

In another embodiment, the system power controller selects physical cores and the desired modifications based on an understanding of the relationship among SMT level, system performance and power consumption for the multi-threaded applications running on the SMT platform. The system can also consider the different phases of the various threads of the multi-threaded applications including CPU intensive phases and memory intensive phases. Therefore, the system 100 includes a power daemon 146 in communication with the system power controller. The power daemon can be configured as software, hardware or a combination of software and hardware executing on one or more computing systems and determines physical cores on which to change the number of logical cores. The power daemon is in communication with one or more databases 148 that contain an identification or listing of a plurality of bins. Each bin contains one or more physical cores and is a subset of the plurality of physical cores within the SMT platform. Each physical core in a given bin having a common power consumption curve of multi-threaded application execution time versus power consumption and a common performance curve of level of multi-threading versus amount of speedup in multi-threaded application execution for a given adjustment of multi-threading level, i.e., a given change in the number of logical cores on a given physical core. This information is also stored in the database in association with the given bin. Therefore, physical cores within a given bin should provide a common performance benefit and power savings based upon a given SMT level adjustment. The power daemon uses the information in the database to determine bins within the plurality of bins to be adjusted, i.e., tuned up or down. This determination is communicated in a SMT-bin selection message 144 sent to the system power controller. The system also includes an offline staging system 150 that may pre-determine the power and performance characteristics of deployed workloads in association with each SMT level and store them in the databases for lookup by the power daemon, while performing power management during actual execution of the workloads.

Exemplary embodiments of systems and methods in accordance with the present invention take advantage of data regarding SMT platform performance and power consumption when processing a parallel workload such as a multi-threaded application. Multithreaded workloads should see speedup proportional to changes in SMT level, which increases the number of available application threads. This speedup or increase in performance, however, is limited due to serial sections of code, synchronization, data dependencies and shared resource contention in hardware. For these reasons, depending on workload characteristics, different multithreaded workloads show different speedup ratio curves. Therefore, systems and methods in accordance with the present invention characterize the workload of multi-threaded applications running on the SMT platform in terms of how much speed-up is achievable. In one embodiment, the offline staging system builds this characterization database.

Figure 2:
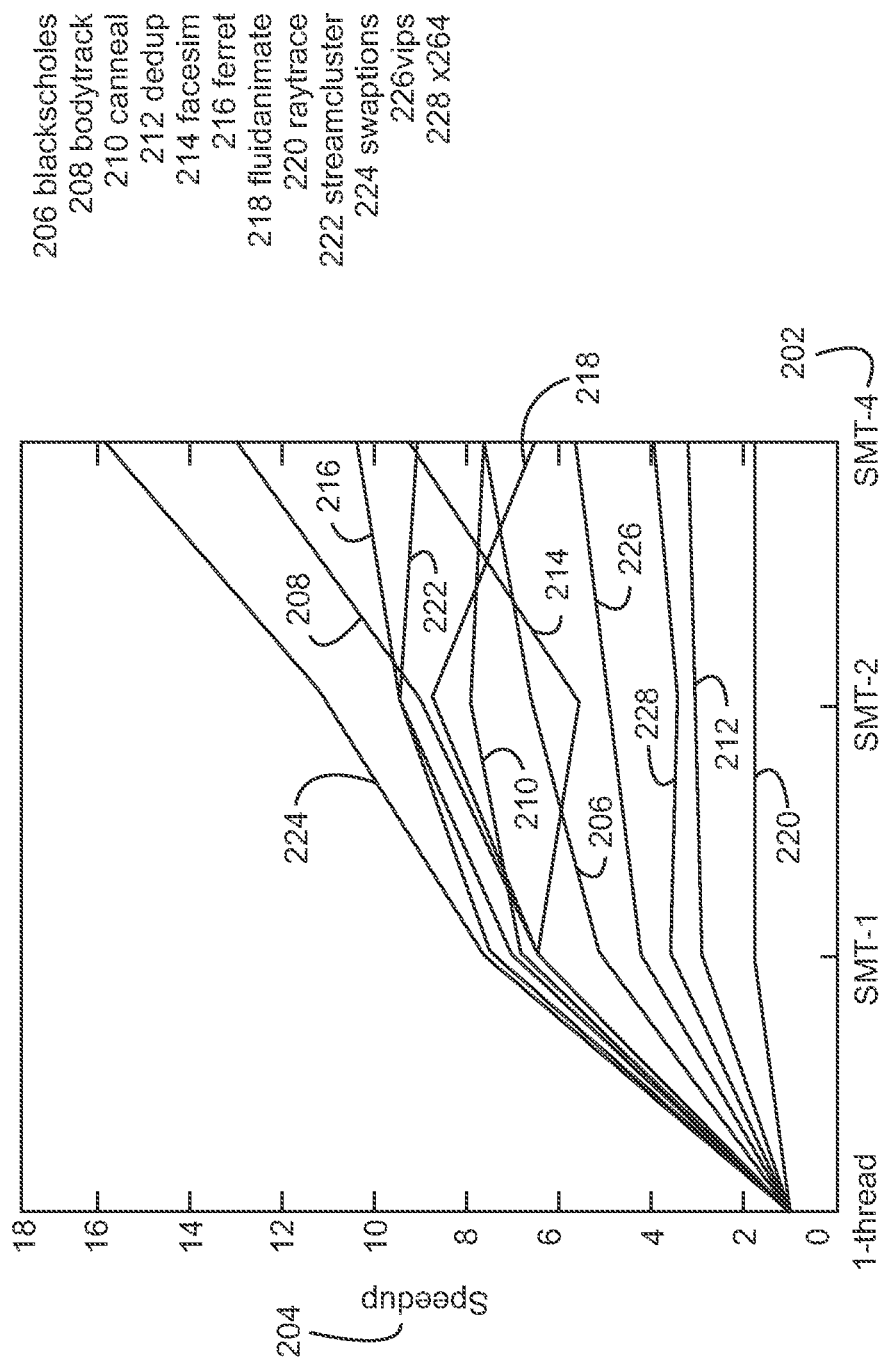
FIG. 2 is a graph of an embodiment of performance speedup versus simultaneous multi-threading level for a plurality of multi-threaded applications.

As an example, the Princeton Application Repository for Shared-Memory Computers (PARSEC) suite of multi-threaded benchmarks is used to demonstrate the use of performance and power curves in adjusting parallelism in the SMT platform. Referring to FIG. 2, a performance graph 200 showing SMT level 202 versus speedup 204 for a plurality of multithreaded applications in PARSEC running on a multi-threaded SMT platform in accordance with the present invention is illustrated. As illustrated, PARSEC is composed of a twelve applications that exhibit varying speedup ratios as the SMT levels change from SMT-1 to SMT-2 to SMT-4. As used herein, the SMT level refers to the number of logical cores on a given physical core within the SMT platform. For example, if the platform contains 4 physical cores, SMT-1 equals 4 total cores, one for each physical core. SMT-2 equals 8 total logical cores, and SMT-4 equals 16 total logical cores. Speedup for each change of SMT level varies from application to application.

As illustrated in FIG. 2, performance speedup based on SMT level is illustrated for a PARSEC suite containing twelve multi-threaded application benchmarks, blackscholes 206, bodytrack 208, canneal 210, dedup 212, facesim 214, ferret 216, fluidanimate 218, raytrace 220, streamcluster 222, swaptions 224, yips 226 and x264 228. The SMT platform is a single 4-way SMT threaded Power7 processor with 8 physical cores. Therefore, an SMT-1 configuration provides 8 logical cores and is equivalent to 8 hardware threads. An SMT-2 configuration and SMT-4 configuration is respectively equivalent to 16 and 32 hardware threads. Based on the speedup curves, these applications are characterized into one or more SMT bins, i.e., applications having common shaped curves for a given change in SMT level are grouped into a given bin. All of the curves illustrate an increase in speedup using the 8 logical cores in the SMT platform, i.e., to SMT-1. However, not all applications realize a performance benefit when moving to SMT-2 or SMT-4. In fact, some actually see a slight decrease in performance.

For example, the curves for dedup 212 and canneal 210 illustrate that these applications do not see benefit from increasing the SMT level to either 2 or 4. Therefore, these applications are grouped into a first bin containing all applications and the cores running these applications. A second bin is for application and cores that show a speedup for an increase in SMT level to 2 but do not realize any speedup for an increase in SMT level to 4. The curve associated with streamcluster 222 indicates that this application belongs in this second bin. A third bin is for the applications and their associated cores that show benefits from SMT changes, but have varying slopes. For example, bodytrack 224 and swaptions 224 have the highest speedup increases between SMT-2 and 4 levels. Although illustrated with three SMT levels and three bins, embodiments of the present invention can utilize higher numbers of SMT levels and more bins.

Figure 3:
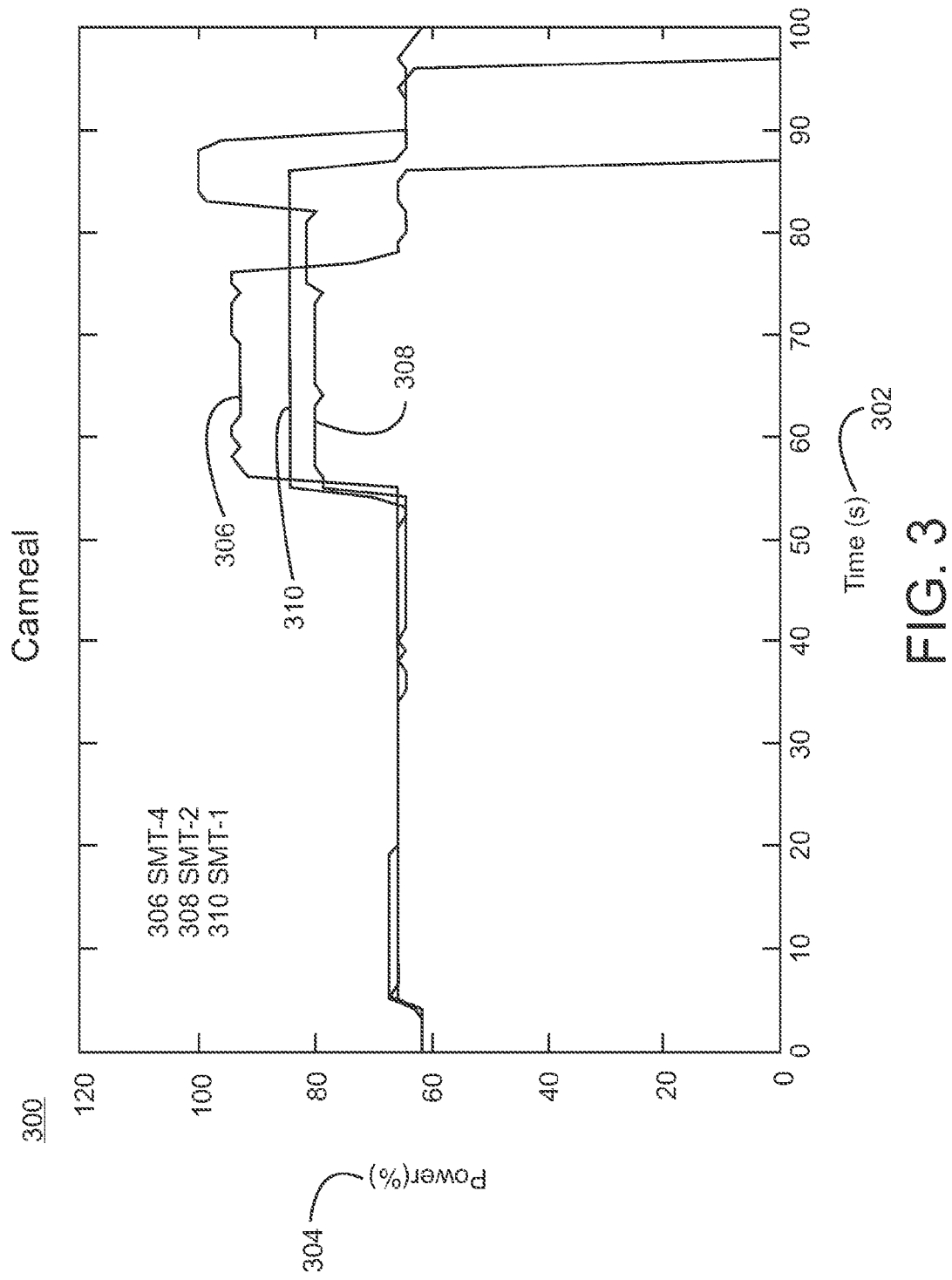
FIG. 3 is a graph of an embodiment of power versus execution time for a given multi-threaded application under different simultaneous multi-threading levels.

In addition to the performance curve information, power consumption information is analyzed for each application running on a given core for a given SMT level. Memory and CPU power consumption for the sample applications in the three SMT bins show how these characteristics are leveraged to make power shifting decisions. For the first bin where multi-threaded applications do not benefit from an increase to SMT level 2 or 4, FIG. 3 provides a plot 300 of execution time 302 versus percentage of power consumption 304 for the application canneal under the three SMT levels, SMT-1 310, SMT-2 308 and SMT-4 306. Canneal consumes 15 W more power when executing on a core with a SMT-4 configuration versus an SMT-1 configuration. However, this increase in power demand does not yield an increase in performance. The increase is attributed to the memory power consumption component as the CPU power consumption component is almost constant for all three SMT levels. This increase in memory power is due to increased memory pressure and does not yield a gain in performance. Therefore, the SMT levels for the core executing these applications can be adjusted down, i.e., the SMT-2 and SMT-4 levels are turned off, yielding a 15 W power savings for no loss in performance. This can be used to bring the SMT platform under a peak power level cap or can be used to increase the SMT levels of cores running applications that will yield a performance benefit from increased SMT levels, i.e., power shifting.

Figure 4:
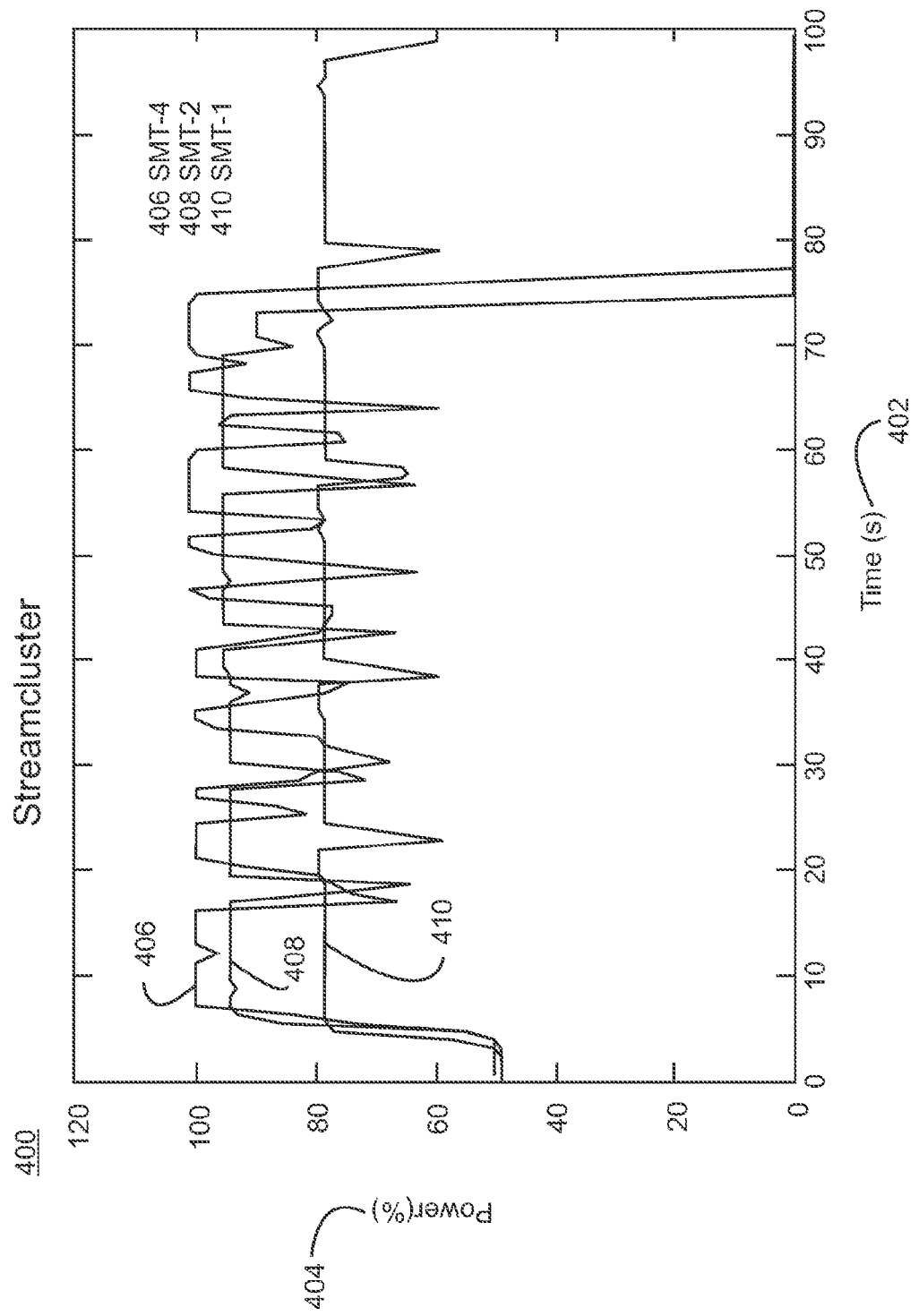
FIG. 4 is a graph of an embodiment of power versus execution time for another multi-threaded application under different simultaneous multi-threading levels.

In the second bin, these multi-threaded applications benefit from an increase to SMT-2 but fail to show a performance benefit from an increase to SMT-4. For this bin, FIG. 4 provides a plot 400 of execution time 402 versus percentage of power consumption 404 for the application streamcluster under the three SMT levels, SMT-1 410, SMT-2 408 and SMT-4 406. Power savings of up to 10 W are possible in SMT-4 is turned off. Again, this power savings can be used to meet a power level cap or can be used to increase the SMT level of another application. It is also noted that power savings of up to 22 W can be realized if the streamcluster bin is limited to SMT-1. This will cause a decrease in performance; however, this may be justified if the power savings can be transferred to other applications having a higher priority level than streamcluster.

Figure 5:
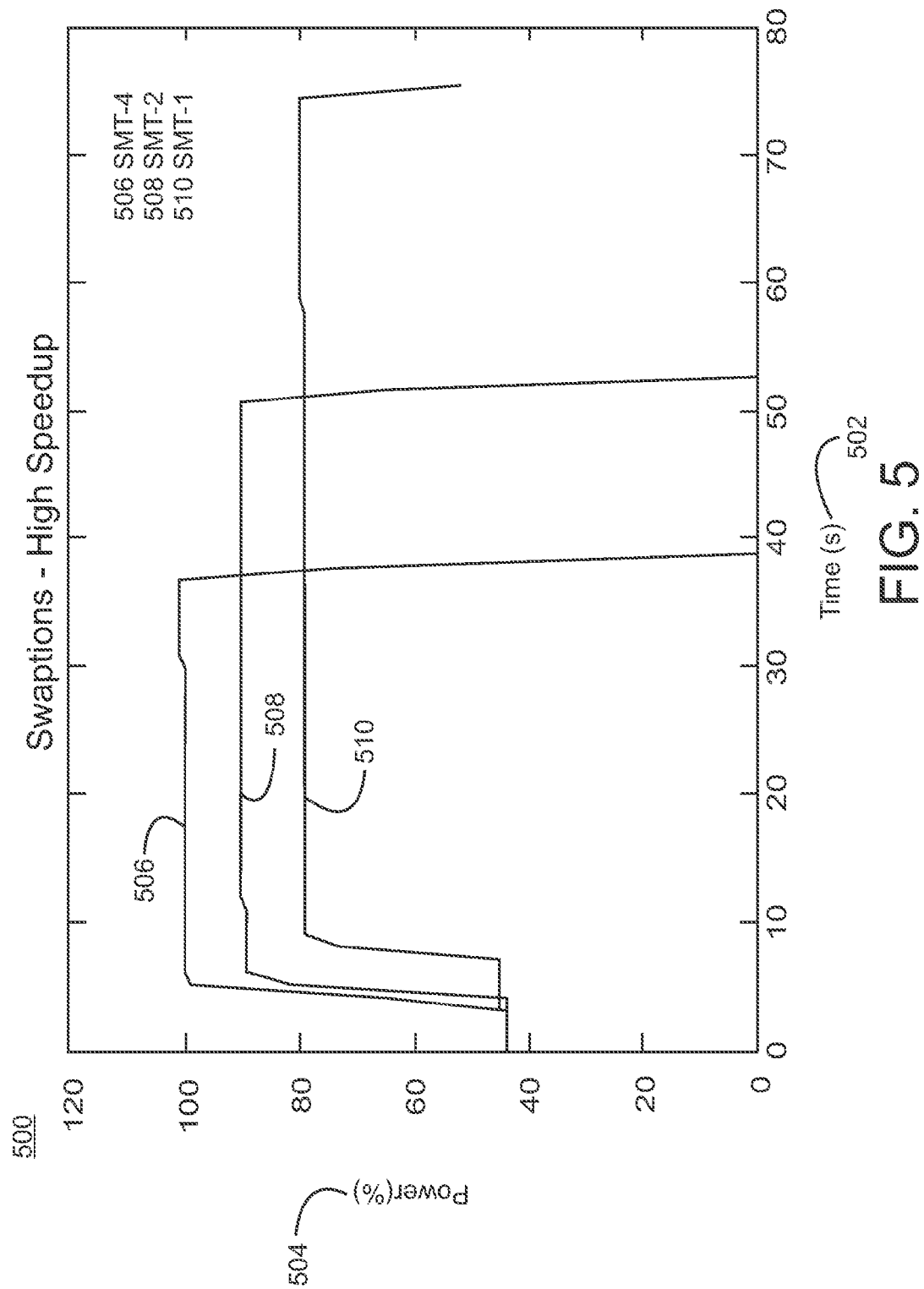
FIG. 5 is a graph of an embodiment of power versus execution time for another multi-threaded application under different simultaneous multi-threading levels.

The third bin contains applications and the associated physical cores that benefit from the highest level of parallelism, SMT-4. For this bin, FIG. 5 provides a plot 500 of execution time 502 versus percentage of power consumption 504 for the application swaptions under the three SMT levels, SMT-1 510, SMT-2 508 and SMT-4 506. The power consumption for this application increases with an increase in SMT level. However, swaptions also realized a significant increase in performance. Therefore, allocation of power to swaptions and other applications in this bin is justified. Therefore, applications in the first and second bin are held at SMT-1 or SMT-2, and the power savings are diverted to the applications in the third bin in order to allowance these applications to run at SMT-4. This provides a maximum performance or maximum throughput for a given power level cap.

There are multi-threaded applications that benefit from SMT changes depending on the current execution phase of that application. For example, raytrace implements a raytracing method used in computer graphics animations. The (IPS) instructions per second (IPS) profile of this application shows that there are two distinct phases of memory intensity followed by CPU intensity during its application runtime. For this application, performance benefits in terms of smaller completion times during the shorter CPU intensive phases are realized for higher SMT levels. Raytrace is a representative of multi-phase applications that exhibit periods of memory intensity (when SMT does not benefit), followed by periods of CPU intensity (when SMT benefits performance). For such applications, a dynamic change in SMT level after correct phase detection can help save power by switching to a lower SMT level during memory intensive phases.

In general, systems and methods in accordance with the present invention manipulate SMT-levels for multi-threaded applications and multi-threaded cores on the SMT platform in order to manage power level within a prescribed cap. This manipulation can be based on three different policies, and these polices can be used alone or in any given combinations. These policies are a naïve serial SMT level shutdown loop, an SMT shutdown by lowest IPS and SMT performance or bin aware power shifting. Serial SMT level shutdown is the least intelligent and simplest of open power control loops. The system power monitor periodically monitors the utilized power in the system. Once the peak utilized power exceeds the power cap, the system power controller starts serially turning down an SMT level on a per-core basis until the power-cap is met. Though this technique has the advantage of being extremely easy to implement, there may be a time complexity overhead in getting the peak power to align with the power cap with this simple loop. Also as this is an open loop control, it is possible that an application, which may benefit from a higher SMT level has to suffer in terms of performance.

SMT shutdown by lowest IPS is more intelligent and starts turning down SMT levels on physical cores that have the least IPS in the previous history interval. Memory intensive workloads tend to exhibit lower IPS values than the CPU intensive counterparts. Also memory intensive workloads do not tend to show performance benefits beyond a certain SMT level. Hence, shutting down serially SMT levels on cores that have the least IPS ensures that performance does not suffer for power benefits. This policy, however, lacks knowledge about the way an operating system (OS) scheduler will schedule threads of a multithreaded application on top of the physical cores, and multi-threaded applications may span across physical cores. Therefore, turning off SMT level only for one core from among a subset of cores that the application may execute on may be detrimental to the performance of the application. In addition, the lowest IPS may not be fully indicative of the overall speedup curve of an application. An instantaneous decision in terms of lowest IPS may prove to be wrong in the longer runtime of the application.

SMT bin aware Power shifting takes into account performance and power curves of various benchmarks that execute on the SMT platform. In this policy, the performance and power curves are known in advance through an offline staging system step. SMT-bins are subsets of physical cores at a particular SMT-level that execute one multi-threaded application. The subset of cores, together with the application constitute a SMT-bin that has a power/performance profile known to the power daemon. When the monitored utilized power cap increases, the system power controller consults the power daemon process on the best SMT-bin from which to take power. The power daemon will then, based on the SMT-bin profiles it possesses, decide on the SMT-bin that needs to be tuned down a given SMT level, e.g., one level. If there is enough reserve power once this action is performed, the saved power is shifted to another SMT bin that will benefit in terms of performance by a higher SMT level. This policy is the most effective of the three policies and uses SMT-level changing as an underlying mechanism to bring about power shifting. In addition, it uses knowledge of performance and power curves of applications to make better decisions in software regarding power management. One advantage of performing these decisions in hardware is that they are more informed as they take into account current scheduler mapping of application threads to cores and their speedup curves. This policy also makes a case for complex policy models in software to guide power management actuators in hardware using better power-related software-hardware interfaces.

Figure 6:
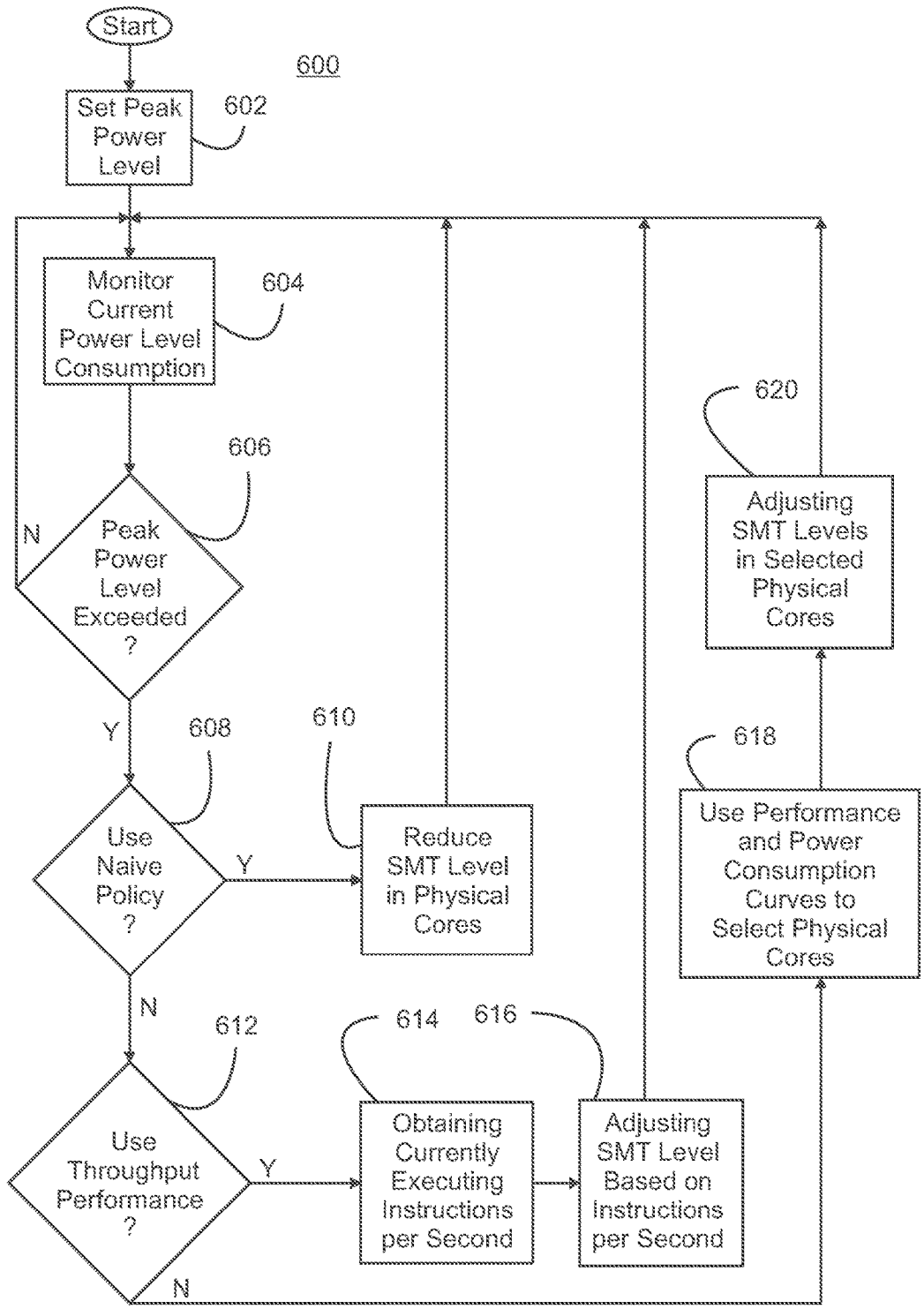
FIG. 6 is a flow chart illustrating an embodiment of a method for managing power consumption in a microprocessor platform in accordance with the present invention.

Referring to FIG. 6, an exemplary embodiment of a method 600 for managing power consumption in a microprocessor platform in accordance with the present invention is illustrated. As illustrated, the method utilizes all three policies in managing power consumption. Initially, a peak power level is set 602 for power consumed by the multi-core microprocessor platform in executing the multi-threaded applications. This multi-core microprocessor platform includes one or more central processing units containing a plurality of physical cores. Each physical core is configurable into a plurality of logical cores. The current power level consumption of the SMT platform is monitored 604, preferably continuously. This includes monitoring the central processing unit power consumption and the memory power consumption. A check is then made regarding whether the peak power level has been exceeded 606. If not, then the current power level consumption monitoring is continued.

When the peak power level has been exceeded, then the a simultaneous multithreading level is adjusted in at least one physical core by changing a number of logical cores on that physical core in response to a power consumption level of the multi-core microprocessor platform exceeding the peak power level in accordance with one of power reducing policies. A determination is made whether the naïve power reduction policy is to be used 608. If the naïve policy is to be used, the multithreading level in a plurality of physical cores is serially decreased by changing the number of logical cores on each physical core 610, and the system is returned to monitoring the current power level consumption and checking against the peak power level. This reduction in SMT level for the physical cores is carried out in a random series, and the serial decreasing of the number of logical cores through the plurality of physical cores is repeated each time the current power consumption level exceeds the peak power level. In one embodiment, changing the number of logical cores further includes decreasing the number of logical cores on at least one physical core and increasing the number of logical cores on at least one physical core, i.e., power shifting. Adjusting the simultaneous multithreading level by decreasing the number of logical cores for a plurality of physical cores in series continues until a current power consumption level is less than or equal to the peak power level.

If the naïve policy is not used, then a determination is made regarding whether to use throughput performance in determining the adjustment of SMT levels 612. The number of currently executing instructions per second for each one of the plurality of physical cores is obtained 614, for example from a historical record or by continuously monitoring the currently executing instructions per second for each one of the plurality of physical cores. Based on this information, the number of logical cores for a given physical core having a lowest number of currently executing instructions per second among the plurality of physical cores is adjusted or decreased. In general, the number of logical cores for a plurality of physical cores is adjusted or decreased in series 616 based upon a number of currently executing instructions per second on each physical core from a lowest number of instructions per second to a highest number of instructions per second until a current power consumption level is less than or equal to the peak power level.

If the throughput performance is not to be used, a power consumption curve of multi-threaded application execution time versus power consumption and a performance curve of level of multi-threading versus amount of speedup in multi-threaded application execution for each physical core is used to select one or more physical cores 618 to have their SMT levels adjusted. The simultaneous multithreading level in the selected physical cores is adjusted 620 to achieve a desired power savings and to maximize performance of the multi-core microprocessor platform in executing the multi-threaded applications. In one embodiment, adjusting the simultaneous multi-threading level in the selected physical cores includes shifting the multi-threading level among the selected physical cores by decreasing the number of logical cores on at least one selected physical core and increasing the number of logical cores on at least one selected physical core. Preferably, physical cores are selected that realize power savings without a decrease in performance for a given decrease in multi-threading level of those physical cores.

In one embodiment, the power consumption curve and the performance curve are used to select physical cores having a largest ratio of power savings to performance decrease for a given decrease in multi-threading level of those physical cores. In addition, physical cores running applications having memory intensive phases during which a given decrease in multi-threading level is possible without a decrease in performance and central processing unit intensive phases in which the given decrease in multi-threading level yields a decrease in performance are identified. Based on this, physical cores are selected during the memory intensive phases. In general, the simultaneous multithreading level in a plurality of physical cores is adjusted to achieve a desired power savings and to maximize performance of the multi-core microprocessor platform in executing multi-threaded applications. After adjusting the SMT levels in the selected physical cores, the system returns to monitoring the current power level consumption and comparing this consumption to the peak power level.

In one embodiment, the performance and power curves are further used to identify a plurality of bins. The plurality of physical cores is arranged into the plurality of bins. Each bin is a subset of the plurality of physical cores, and each physical core in a given bin has a common power consumption curve of multi-threaded application execution time versus power consumption and a common performance curve of level of multi-threading versus amount of speedup in multi-threaded application execution for a given adjustment of multi-threading level. At least one bin from the plurality of bins is selected. Alternatively, a plurality of bins is selected. The simultaneous multi-threading levels are then adjusted, i.e., increased or decreased, for all physical cores in each selected bin or bins.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for managing power consumption in a microprocessor platform in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for managing power consumption in a microprocessor platform, the method comprising:
setting a peak power level for power consumed by a multi-core microprocessor platform executing multi-threaded applications, the multi-core microprocessor platform comprising a plurality of physical cores, each physical core configurable into a plurality of logical cores; and
adjusting a simultaneous multithreading level in at least one physical core by changing a number of logical cores on that physical core in response to a power consumption level of the multi-core microprocessor platform exceeding the peak power level by:
using a power consumption curve of multi-threaded application execution time versus power consumption and a performance curve of level of multi-threading versus amount of speedup in multi-threaded application execution for each physical core to select at least one of one or more physical cores from which power consumption can be taken by decreasing multithreading levels while maintaining performance levels thereby decreasing power allocated to physical cores with decreased multithreading levels and one or more physical cores to which power can be shifted to increase multithreading levels to achieve a highest increase in performance level by increasing the number of logical cores; and
adjusting the simultaneous multithreading level in the selected physical cores to achieve a desired power savings and to maximize performance of the multi-core microprocessor platform in executing multi-threaded applications.

2. The method of claim 1, wherein the step of adjusting the simultaneous multithreading level further comprises adjusting the multithreading level in a plurality of physical cores by changing the number of logical cores on each physical core.

3. The method of claim 2, wherein changing the number of logical cores further comprises decreasing the number of logical cores on at least one physical core and increasing the number of logical cores on at least one physical core.

4. The method of claim 1, wherein the step of adjusting the simultaneous multithreading level further comprises decreasing the number of logical cores for a plurality of physical cores in series until a current power consumption level is less than or equal to the peak power level.

5. The method of claim 4, wherein:
the method further comprises monitoring the current power level consumption continuously; and
repeating the serial decreasing of the number of logical cores through the plurality of physical cores each time the current power consumption level exceeds the peak power level.

6. The method of claim 1, wherein the step of adjusting the simultaneous multithreading level further comprises decreasing the number of logical cores for a given physical core having a lowest number of currently executing instructions per second among the plurality of physical cores.

7. The method of claim 1, wherein the step of adjusting the simultaneous multithreading level further comprises decreasing the number of logical cores for a plurality of physical cores in series based upon a number of currently executing instructions per second on each physical core from a lowest number of instructions per second to a highest number of instructions per second until a current power consumption level is less than or equal to the peak power level.

8. The method of claim 1, wherein the method further comprises monitoring the number of currently executing instructions per second continuously for each one of the plurality of physical cores.

9. The method of claim 1, wherein the step of adjusting the simultaneous multithreading level further comprises adjusting the simultaneous multithreading level in a plurality of physical cores to achieve a desired power savings and to maximize performance of the multi-core microprocessor platform in executing multi-threaded applications.

10. The method of claim 1, wherein the step of adjusting the simultaneous multi-threading level in the selected physical cores comprises shifting the multi-threading level among the selected physical cores by decreasing the number of logical cores on at least one selected physical core and increasing the number of logical cores on at least one selected physical core.

11. The method of claim 1, wherein the step of using the power consumption curve and the performance curve further comprises selecting physical cores that realize power savings without a decrease in performance for a given decrease in multi-threading level of those physical cores.

12. The method of claim 1, wherein the step of using the power consumption curve and the performance curve further comprises selecting physical cores having a largest ratio of power savings to performance decrease for a given decrease in multi-threading level of those physical cores.

13. The method of claim 1, wherein the step of using the power consumption curve and the performance curve further comprises:
identifying physical cores running applications having memory intensive phases during which a given decrease in multi-threading level is possible without a decrease in performance and central processing unit intensive phases in which the given decrease in multi-threading level yields a decrease in performance; and
selecting physical cores during the memory intensive phases.

14. A method for managing power consumption in a microprocessor platform, the method comprising:
setting a peak power level for power consumed by a multi-core microprocessor platform executing multi-threaded applications, the multi-core microprocessor platform comprising a plurality of physical cores, each physical core configurable into a plurality of logical cores; and
adjusting a simultaneous multithreading level in at least one physical core by changing a number of logical cores on that physical core in response to a power consumption level of the multi-core microprocessor platform exceeding the peak power level by:
arranging the plurality of physical cores into a plurality of bins, each bin comprising a subset of the plurality of physical cores, each physical core in a given bin having a common power consumption curve of multi-threaded application execution time versus power consumption and a common performance curve of level of multi-threading versus amount of speedup in multi-threaded application execution for a given adjustment of multi-threading level;
selecting at least one bin from the plurality of bins, the selected bins comprising at least one of physical cores from which power consumption can be taken by decreasing multithreading levels while maintaining performance levels thereby decreasing power allocated to physical cores with decreased multi-threading levels and physical cores to which power can be shifted to increase multithreading levels to achieve a highest increase in performance level by increasing the number of logical cores; and
adjusting simultaneous multi-threading levels for all physical cores in each selected bin.

15. A non-transitory computer-readable storage medium containing a computer-readable code that when read by a computer causes the computer to perform a method for managing power consumption in a microprocessor platform, the method comprising:
setting a peak power level for power consumed by a multi-core microprocessor platform executing multi-threaded applications, the multi-core microprocessor platform comprising a plurality of physical cores, each physical core configurable into a plurality of logical cores; and
adjusting a simultaneous multithreading level in at least one physical core by changing a number of logical cores on that physical core in response to a power consumption level of the multi-core microprocessor platform exceeding the peak power level by:
using a power consumption curve of multi-threaded application execution time versus power consumption and a performance curve of level of multi-threading versus amount of speedup in multi-threaded application execution for each physical core to select at least one of one or more physical cores from which power consumption can be taken by decreasing multithreading levels while maintaining performance levels thereby decreasing power allocated to physical cores with decreased multi-threading levels and one or more physical cores to which power can be shifted to increase multithreading levels to achieve a highest increase in performance level by increasing the number of logical cores; and
adjusting the simultaneous multithreading level in the selected physical cores to achieve a desired power savings and to maximize performance of the multi-core microprocessor platform in executing multi-threaded applications.

16. The non-transitory computer-readable storage medium of claim 15, wherein the step of adjusting the simultaneous multi-threading level in the selected physical cores comprises shifting the multi-threading level among the selected physical cores by decreasing the number of logical cores on at least one selected physical core and increasing the number of logical cores on at least one selected physical core.

17. The non-transitory computer-readable storage medium of claim 15, wherein the step of using the power consumption curve and the performance curve further comprises selecting physical cores that realize power savings without a decrease in performance for a given decrease in multi-threading level of those physical cores.

18. The non-transitory computer-readable storage medium of claim 15, wherein the step of using the power consumption curve and the performance curve further comprises selecting physical cores having a largest ratio of power savings to performance decrease for a given decrease in multi-threading level of those physical cores.

19. The non-transitory computer-readable storage medium of claim 15, wherein the step of using the power consumption curve and the performance curve further comprises:
identifying physical cores running applications having memory intensive phases during which a given decrease in multi-threading level is possible without a decrease in performance and central processing unit intensive phases in which the given decrease in multi-threading level yields a decrease in performance; and
selecting physical cores during the memory intensive phases.

20. The non-transitory computer-readable storage medium of claim 15, wherein the method further comprises monitoring the number of currently executing instructions per second continuously for each one of the plurality of physical cores.

\* \* \* \* \*